(12) United States Patent
Bruhat et al.

(10) Patent No.: US 12,458,813 B2
(45) Date of Patent: Nov. 4, 2025

(54) IMPLANTABLE DEVICE AND METHOD OF BRAIN BIOMODULATION (71) Applicant: Icahn School of Medicine at Mount Sinai, New York, NY (US)

(72) Inventors: Alexis Bruhat, New York, NY (US); Turner Baker, New York, NY (US); Christopher Kellner, New York, NY (US); Anthony Costa, New York, NY (US)

(73) Assignee: Icahn School of Medicine at Mount Sinai, New York, NY (US)

( * ) Notice: Subject to any disclaimer, the term of this patent is extended or adjusted under 35 U.S.C. 154(b) by 350 days.

(21) Appl. No.: 18/038,362

(22) PCT Filed: Nov. 23, 2021

(86) PCT No.: PCT/US2021/060508
§ 371 (c)(1),
(2) Date: May 23, 2023

(87) PCT Pub. No.: WO2022/115425
PCT Pub. Date: Jun. 2, 2022

(65) Prior Publication Data
US 2024/0001141 A1    Jan. 4, 2024

Related U.S. Application Data

(60) Provisional application No. 63/117,784, filed on Nov. 24, 2020.

(51) Int. Cl.
*A61N 5/06* (2006.01)
(52) U.S. Cl.
CPC ......... *A61N 5/0622* (2013.01); *A61N 5/0601* (2013.01); *A61N 5/0618* (2013.01);
(Continued)

(58) Field of Classification Search
CPC .. A61N 5/0622; A61N 5/0601; A61N 5/0618; A61N 2005/0632;
(Continued)

(56) References Cited

U.S. PATENT DOCUMENTS 10,213,596 B2 * 2/2019 Orinski .............. A61N 1/37211
11,135,443 B2 * 10/2021 Vermandel ........... A61N 5/0603
(Continued)

FOREIGN PATENT DOCUMENTS

WO    2015006309    1/2015

OTHER PUBLICATIONS

Michael R Hamblin et al. "Significant Improvement in Cognition in Mild to Moderately Severe Dementia Cases Treated with Transcranial Plus Intranasal Photobiomodulation: Case Series Report" in Photomedicine in Surgery 35(8) (Aug. 2017).
(Continued)

*Primary Examiner* — Jonathan T Kuo
(74) *Attorney, Agent, or Firm* — Leason Ellis LLP (57) ABSTRACT

An intracranial photobiomodulation system (IPS) comprises a removeable light therapy implant and a permanent sheath. The removeable light therapy implant is adapted to be removably secured to the sheath and has (i) a support arm having a proximal end and a distal end, and (ii) at least one light source located along the support arm. The at least one light source is configured to emit light of at least one wavelength and at least one intensity. The permanent sheath comprises a shell and a sleeve. The shell is adapted to be permanently secured to a patient's scalp and the sleeve is made of a transparent material that allows light to pass therethrough and has a proximal opening and a distal closed tip, the proximal opening is adapted to removably receive the support arm and light source of the removeable light therapy implant.

23 Claims, 5 Drawing Sheets

(52) U.S. Cl.
CPC ............... *A61N 2005/0632* (2013.01); *A61N 2005/0647* (2013.01); *A61N 2005/0651* (2013.01)

(58) Field of Classification Search
CPC .... A61N 2005/0647; A61N 2005/0651; A61N 5/06–2005/073; A61B 5/4088; A61B 5/4839; A61B 5/6868; A61B 2090/103
See application file for complete search history.

(56) References Cited

U.S. PATENT DOCUMENTS

| | | | |
|---|---|---|---|
| 2009/0048622 A1* | 2/2009 | Wilson | A61B 17/3431 606/190 |
| 2009/0054955 A1 | 2/2009 | Kopell et al. | |
| 2017/0281927 A1* | 10/2017 | Orinski | A61N 1/0536 |
| 2017/0332887 A1* | 11/2017 | Davis | A61B 5/1473 |
| 2020/0289840 A1* | 9/2020 | Vermandel | A61N 5/062 |

OTHER PUBLICATIONS

International Search Report and Written Opinion in PCT Application No. PCT/US2021/060508, mailed Mar. 18, 2022 (14 pages).

* cited by examiner

IMPLANTABLE DEVICE AND METHOD OF BRAIN BIOMODULATION

CROSS-REFERENCE TO RELATED APPLICATION

The present application is a U.S. National Phase Application under 35 U.S.C. § 371 of International Patent Application No. PCT/US2021/060508, filed on Nov. 23, 2021, which claims the benefit of and priority to U.S. patent application Ser. No. 63/117,784, filed Nov. 24, 2020, all of which are incorporated by reference as if expressly set forth in their respective entireties.

TECHNICAL FIELD

The present invention relates to treatment of neurobiological conditions using radiation, and more particularly relates to an implantable device having light-emitting elements that is implanted inside the cranium and is used for brain biomodulation using near-infrared radiation.

BACKGROUND OF THE DISCLOSURE

Alzheimer's Disease (AD) is a common, neurologically devastating disease with no effective treatment. The disease is characterized by a gradual onset of dementia in the elderly most often involving memory loss, inability to perform complex tasks, and confusion. During the development of AD, degeneration of neurons starts most typically in the brainstem (Pons-Medulla) before progressing to the hippocampus, frontal lobe, amygdala, parietal lobe, and temporal lobe. The cause is unknown but appears to be multifactorial, with most research aimed at the amyloid-beta (Aβ) peptides and tau proteins. Irregular clearance and metabolism of these proteins seem likely contributors to the presentation of the disease.

The origin of the disease is still unknown, and the discovery of factors related to AD's key pathophysiological structures has not been able to uncover the source of the accelerated pathway of the aging process observed in these patients. Thus, the risk of developing AD is ultimately believed to be determined by a combination of genetic, metabolic, behavioral, and environmental factors. AD is thus a complex disorder that ultimately leads to neurodegeneration in those afflicted with the disease. AD is typically classified in terms of three stages: mild, moderate, and severe. Patients are considered to have mild disease once memory impairment becomes noticeable, but the rate at which patients advance varies, depending on their condition type and the quality of care they receive.

As pharmaceuticals have proven largely ineffective for treating AD, new techniques are being developed to tackle this widespread problem. One of the emerging techniques, deep brain stimulation (DBS), involves implanting electrodes within specific targets in the brain. These electrodes produce electrical impulses that are intended to regulate or interrupt abnormal circuits or affect certain cells and chemicals within the brain. The amount of stimulation in DBS is controlled by a pacemaker-like device placed under the skin the upper chest or cranium of a patient. A wire under the skin connects this device to the electrodes in the brain. DBS has been used to treat a number of neurological conditions including essential tremor, Parkinson's disease, dystonia; epilepsy, Tourette's syndrome, chronic pain and obsessive-compulsive disorder. It is also being studied as an experimental treatment for major depression, stroke recovery, addiction, and dementia. Thus far, DBS has not been demonstrated to be effective in the treatment of AD.

Another emerging technique that is being applied to treat neurological illness involves photobiomodulation (PBM). PBM is a well-established treatment in the fields of dermatology and wound healing. However, there has been a recent increase in interest in the use of PBM for the treatment for more complex diseases that occur below the surface of the body. Some studies have shown that PBM can reduce neuroinflammation, promote neurogenesis, and reduce cognitive impairment following ischemia. Specifically, infrared therapy has been shown to enhance the metabolic capacity of neurons and to stimulate anti-inflammatory, anti-apoptotic, and antioxidant responses, as well as neurogenesis and synaptogenesis generally.

A recently-developed PBM technique employs transcranially-delivered near-infrared stimulation. Near-infrared radiation (NIR) is commonly used for imaging of human brain activity but has recently been applied therapeutically. Some animal studies indicate beneficial effects of NIR treatment in AD (particularly those displaying β-amyloid). NIR appears to be safe and has received non-significant risk status by the Food and Drug Administration. A transcranial intranasal NIR stimulation device has been proposed. See Michael R Hamblin et al. "*Significant Improvement in Cognition in Mild to Moderately Severe Dementia Cases Treated with Transcranial Plus Intranasal Photobiomodulation: Case Series Report*" in Photomedicine in Surgery 35(8) (2017).

However, there are doubts within the neurological field as to how effective NIR will be when delivered transcranially. Experiments have shown NIR can be spread only 2-3 centimeters through the brain due to absorption by the cranium. At its closest point, the brainstem is located between 7-10 centimeters from the cranium, while structures closely tied to progressive neurodegeneration are similarly inaccessible to light therapy through a transcranial route. It is therefore unlikely that transcranially-delivered NIR can effectively treat early to middle stage AD.

It is with respect to these and other considerations that the disclosure made herein is presented.

SUMMARY OF THE DISCLOSURE

The present disclosure provides an intracranial photobiomodulation system (IPS) that comprises a removeable light therapy implant and a permanent sheath. The removeable light therapy implant is adapted to be removably secured to the sheath and has (i) a support arm having a proximal end and a distal end, and (ii) at least one light source located between the proximal and distal ends of the support arm. At least one light source is configured to emit light of at least one wavelength, at least one intensity, and at a set timing and duration. The permanent sheath comprises a shell and a sleeve. The shell is adapted to be permanently secured to a patient's scalp and the sleeve is made of a transparent material that allows light to pass therethrough and has a proximal opening and a distal closed tip, the proximal opening is adapted to removably receive the support arm and light source of the removeable light therapy implant.

In another aspect, the present disclosure provides a method for intracranial photobiomodulation comprising the steps of a) providing an implantable photobiomodulation device comprising a removeable light therapy implant and a permanent sheath, the removeable light therapy implant adapted to be removably secured to the sheath and having (i) a support arm having a proximal end and a distal end, and (ii) at least one light source located between the proximal and distal ends of the support arm. The at least one light source is configured to emit light of at least one wavelength, at least one intensity, and at a set timing and duration, and the permanent sheath comprises a shell and a sleeve, the shell being adapted to be permanently secured to a patient's scalp, the sleeve being made of a material that allows light to pass therethrough and having a proximal opening and a distal closed tip, the proximal opening adapted to removably receive the support arm and at least one light source of the removeable light therapy implant; b) inserting the sleeve of the permanent sheath into the patient's cranium and securing the shell of the permanent sheath to the patient's scalp; c) inserting the support arm and at least one light source through the proximal opening of the permanent sheath; and d) activating the implantable photobiomodulation device.

These and other aspects, features, and advantages can be appreciated from the following description of certain embodiments of the invention and the accompanying drawing figures and claims.

BRIEF DESCRIPTION OF THE DRAWINGS

FIG. 7A-7D are sagittal cross-sectional views of an exemplary human head which illustrate stages in the installation of an implantable device according to an embodiment of the present disclosure.

DETAILED DESCRIPTION OF CERTAIN EMBODIMENTS OF THE DISCLOSURE

The present disclose describes an implantable device that delivers intracranial PBM (i.e., within the brain and under the cranium). While the implantable PBM device is intended to treat the memory-associated symptoms of Alzheimer's Disease, the device and associated method of intracranial PBM delivery can be applied to other neurological conditions and can be used for other applications including optogenetic modulation.

Embodiments of the device includes an intracranial removable light therapy implant and a sheath that is designed to be permanently fixed in position. The term "permanently fixed in position" herein means that the device is securely affixed to and implanted in the patient and can remain in this position indefinitely, e.g., for the remainder of the patient's life, unless the device is deliberately removed using surgical techniques by medical personnel. Such surgical removal may be performed if it is believed that the device is malfunctioning. The implant and sheath extend though the cranium such that a length of the implant is positioned within the cranial cavity. The implant includes light sources, such as LEDs that provide near-infrared radiation in the brain. The device can be used in association with an RFID transmitter fitted to a headband that serves to maintain the charge of the implant. Together, the implantable device and the headband with RFID transmitter can be considered to comprise a PBD "system".

Figure 1:
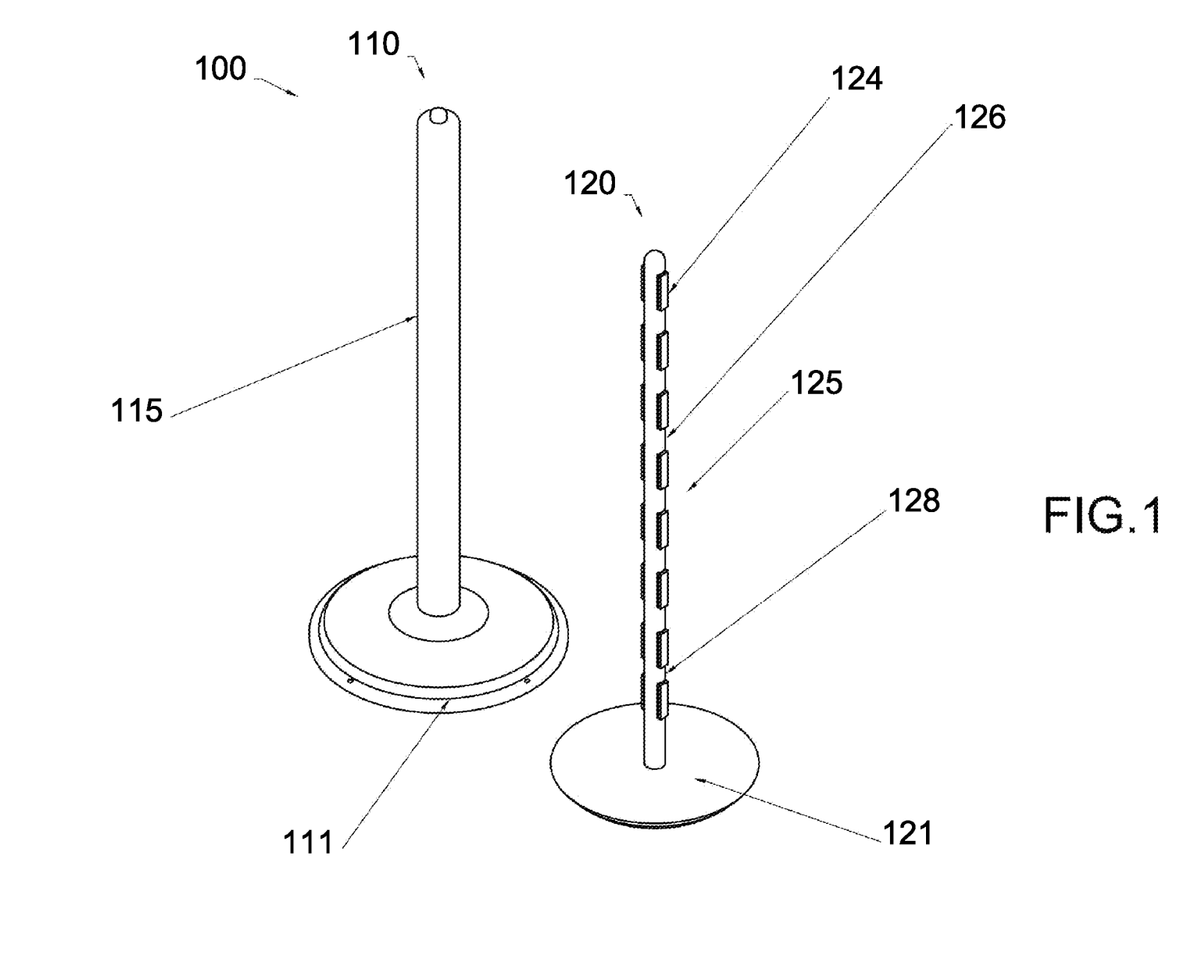
FIG. 1 is an exploded perspective view of an embodiment of an implantable photobiomodulation device according to the present disclosure in a disengaged state.

FIG. 1 is a perspective view of an embodiment of an implantable photobiomodulation device 100 (hereinafter referred to as the "implantable device" for brevity) according to the present disclosure in a disengaged state. As shown, the implantable device 100 includes two distinct parts, a hollow sheath 110 and a removable light therapy implant (hereinafter termed "LED implant"). The sheath 110 includes a disc-shaped proximal portion (shell) 111 from which extends a linearly extending distal portion, referred to as a sleeve 115. The sheath 110 is preferably made of a flexible and transparent material allowing the sleeve 115 to bend fully, e.g., up to 180 degrees in one embodiment. Example materials from which the sheath can be made include polymers such as polyurethane (PU), polytetrafluoroethylene (PTFE), fluorinated ethylene propylene (FEP), silicone, or combinations thereof. The sheath 110, at least the sleeve 115, is formed of a transmissive material that permits light of the wavelengths described herein to pass therethrough. The sleeve 115 can be transparent as well but is not limited to such construction so long as it is light transmissive. In one embodiment, the diameter of the proximal portion 111 of the sheath is approximately 2.1 cm and the length of the sleeve 115 is approximately 6 cm. In other embodiments the sleeve can be longer to reach deep brain regions. The end of the sleeve 115 can comprise a closed tip. In certain embodiments, the sheath 110 includes linings, coatings, vesicles or other features that enable the sheath to deploy active ingredients such as drugs, anti-infective agents and/or cellular treatments intracranially at a primary site of early-stage AD while limiting infection. For example, the exterior of the sheath 110 (e.g., entire exterior surface area of the sleeve 115) can include a coating for deploying one of the above agents. In addition, depending on the agent, it may be infused within the polymer of the sheath for timed release therefrom (diffusion).

As shown in the figures, the proximal portion 111 has a concave shape in that the section of the proximal portion 111 that faces away from the sleeve 115 is concave and thus, defines a recessed cavity or compartment. In addition, the center of the proximal portion 111 includes a through hole 119 that forms an entrance into the hollow sleeve 115. In one embodiment, the floor around the through hole 119 is generally flat (planar); however, it can be curved (concaved).

The LED implant 120 similarly includes a proximal portion 121 comprising a shell or cap. The proximal portion 121 is sized and shaped to receive the proximal portion 111. Since both are disc-shaped structures, the diameter of the proximal portion 111 is greater than the diameter of the proximal portion 121 to allow the proximal portion 121 to seat and rest within the concave shaped recessed compartment of the proximal portion 111. As discussed in the following, the proximal portion 121 can house an LED actuator and an RFID receiver. The RFID receiver can receive electric transmission from an external RFID transmitter. The LED implant 120 also includes a flexible distal portion that extends linearly from the proximal portion 121, and is referred to herein as being a "support arm 125". The support arm 125 is also made of a flexible material and can be composed of polymer materials. In one embodiment, the diameter of the proximal shell portion 121 of the LED implant is approximately 1.5 cm. and the length of the support arm is approximately 5.9 cm. In other embodiments, the support can be longer to reach deep brain regions. In the embodiment shown in FIG. 1, a plurality of light sources, such as LED elements, e.g., 124, 126, 128, that emit near-infrared radiation, are positioned along the length of the support arm 125. The LED elements 124, 126, 128 can transmit radiation of 670 nm, 850 nm or 950 nm wavelengths and combinations thereof although other wavelengths are possible. In one embodiment, the light emitted from the LED elements is light of a wavelength equal to or greater than 700 nanometers and in one embodiment, the light of at least one wavelength is light of a wavelength of 380 nanometers to 700 nanometers.

The LED actuator can be configured to turn on one or more of the LEDs with at a set time and for prescribed duration to establish on/off cycles for providing radiation to a brain region. As one example, the LED actuator can be set (programmed) to turn on the LEDs for several minutes (e.g., 2-3 minutes) every two, three or four hours. It will be appreciated by those of skill in the art that the timing of light pulses from the LEDs can be set in various ways suitable to the therapy being provided. The LED actuator can thus be in communication with an onboard processor and memory that can store software that is executed to operate the LED actuator. In the memory, a schedule can be saved that includes information on how often the LEDs should be turned on and for what duration. In some embodiments, the LED actuator can be controlled wirelessly after installation to modify the timing and duration settings. The, the length of the individual LED elements, e.g., 124, 126, 128 can range between 1 cm to 15 cm and the diameter of the LED elements can range from 1 mm to 10 mm, depending on the number of LED elements installed and the size of the support arm 125. In alternative embodiments, the LED elements can be of different sizes and can be distributed evenly or unevenly along the length. For example, in some embodiments, the LED implant can include a smaller number of LED elements positioned proximate to the tip (distal end) so as to provide radiation to a localized region of the brain. LED element 120 can also include one or more temperature sensors (not shown) that aid in verifying the functional status of the LED implant. The LED implant 120 is designed to fit into the sheath 110 with some tolerance while being fully protected from the intracranial environment and thus the overall shapes of the sheath 110 and LED implant 120 conform to each other.

In addition to the timing and duration of the light pulses, the total intensity of light emitted from the LED elements is set at a level designed to provide therapy while avoiding overheating. Light intensity, or irradiance, is a measure of incident intensity per unit area, most typically reported in $W/cm^2$. Irradiances suitable for applications in photobiomodulation therapy typically range from 0.1 $mW/cm^2$ to 5 $W/cm^2$. However, it will be understood that irradiances that fall outside this exemplary range can also be suitable in certain applications. The irradiance selected can depend on a number of factors such as the brain region treated, the wavelength of emitted light, and the amount of power available.

Figures 2A, 2B, 3A, 3B:
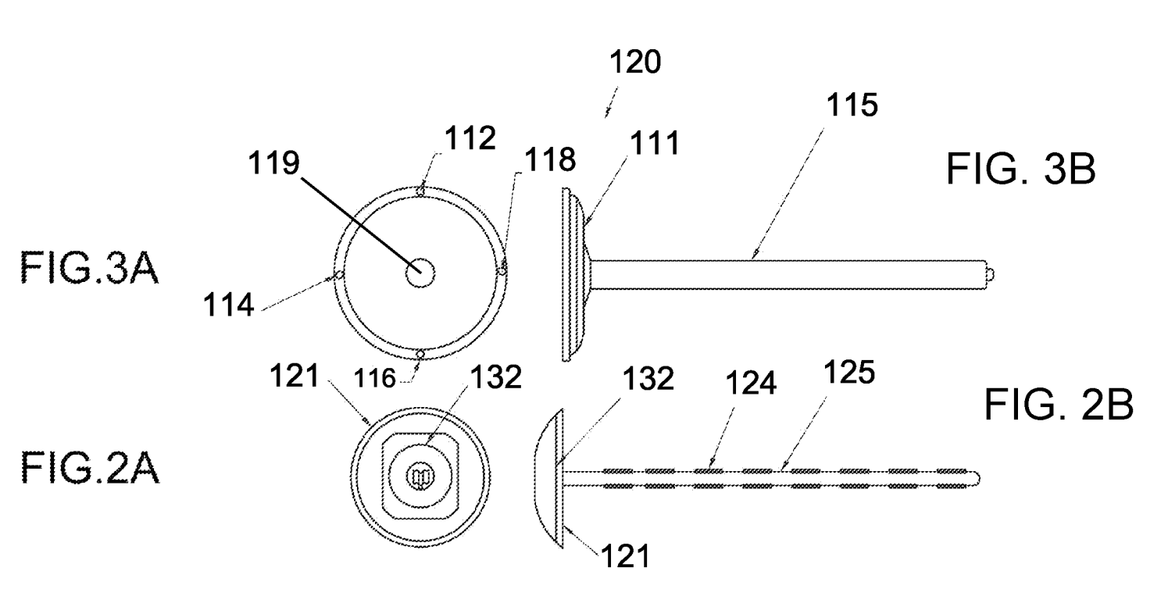
FIG. 2A is a top cross-sectional view of an embodiment of an LED implant according to the present disclosure as viewed at the distal end of the device.
FIG. 2B is a side cross-sectional view of an embodiment of an LED implant according to the present disclosure.
FIG. 3A is a top cross-sectional view of an embodiment of a sheath for receiving the LED implant according to the present disclosure as viewed from the distal end of the device.
FIG. 3B is a side cross-sectional view of an embodiment of a sheath for receiving the LED implant according to the present disclosure.

FIGS. 2A and 2B are top and side cross-sectional views of the embodiment of the LED implant 120 according to the present disclosure shown in FIG. 1. As shown in FIG. 2A, the shell (proximal end portion) 121 of the LED implant 120 includes an RFID receiving coil 132 which can operate according to the Qi RFID standard. While in the view shown in FIG. 2A only a receiving coil 132 is depicted, in various embodiments of the LED implant, the shell 121 includes additional components (e.g., LED actuator and associated hardware) as discussed further below and shown in the embodiments depicted in FIGS. 4A and 4B.

Figures 4A, 4B:
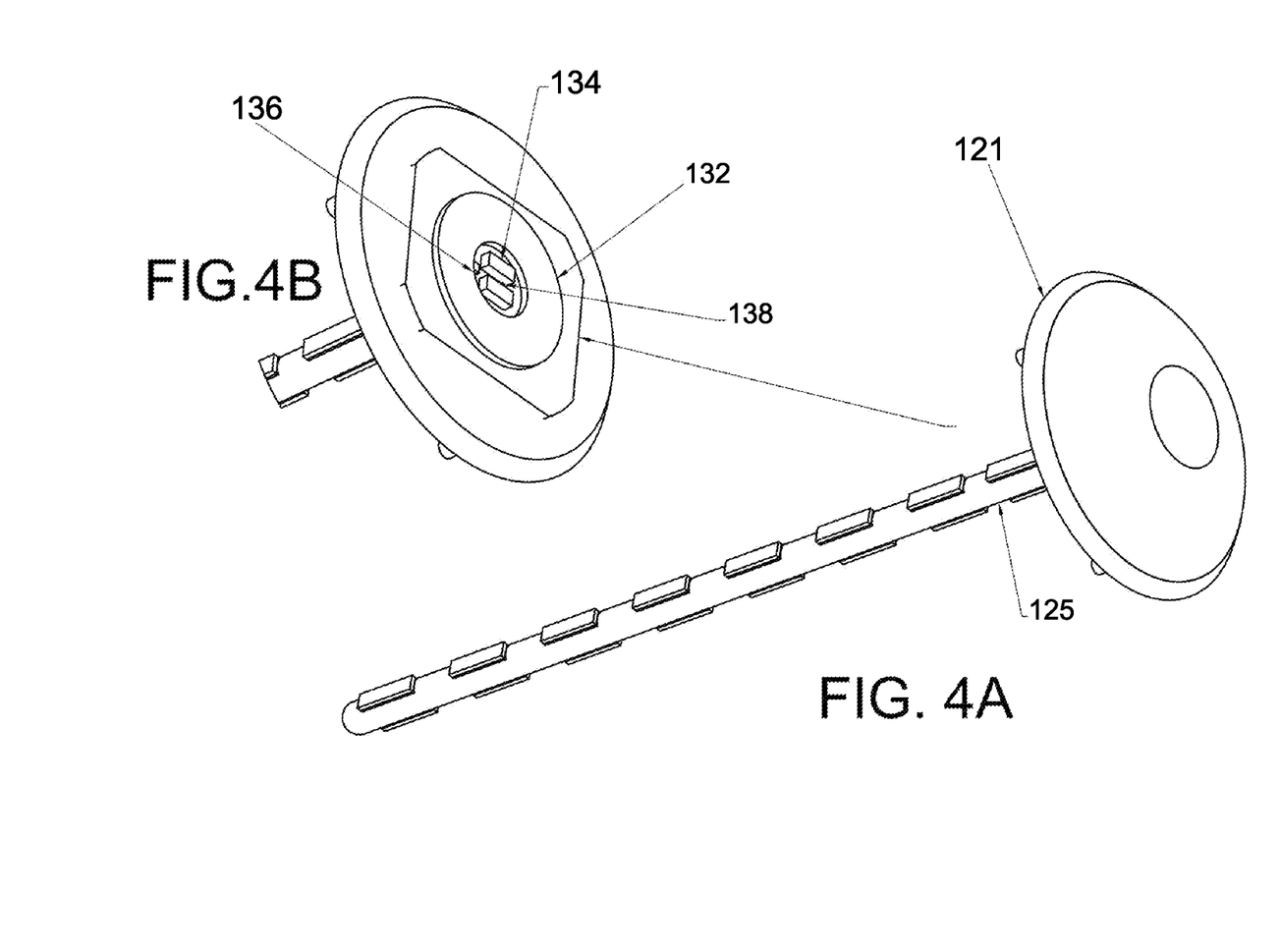
FIG. 4A is a perspective view of the LED implant shown in FIG. 1A with an exploded view of the proximal portion.
FIG. 4B is an enlarged view of area (A) shown in FIG. 4A.

FIGS. 3A and 3B are top and side cross-sectional views of the embodiment of a sheath 110 according to the present disclosure shown in FIG. 1. As shown in FIG. 3A, the proximal portion 111 of the sheath includes a set of holes 112, 114, 116, 118 that enable fixation of the sheath to the cranium via surgical screws. While four holes are shown, the proximal portion 111 can include a greater number of holes, and fewer holes are possible but less recommended. In addition, it is seen that the holes 112, 114, 116, 118 can be formed in a circumferential flange that surrounds the main concave-shaped section of the proximal portion 121. As shown in FIGS. 4A and 4B, an inner face of the proximal portion 121 can include a plurality of pegs or feet that face the support arm 125. These feet can be spaced circumferentially apart from one another along an outer peripheral edge of the proximal portion 121. When the support arm 125 is introduced into the proximal portion 111, it passes into and through the through hole 119 into the hollow sleeve 115. The support arm 125 is fed into the hollow sleeve 115 until the proximal portion 121 seats within the proximal portion 111 (e.g., when the feet contact the floor of the proximal portion 111). Preferably, the support arm 125 extend at least substantially the entire length of the sleeve 115 when the LED implant 120 is coupled to the hollow sheath 110.

FIG. 4A is a perspective view of the LED implant 120 with an exploded view of the shell 121. The area (A) in FIG. 4A is shown in an enlarged view in FIG. 4B. As shown in greater detail in FIG. 4B, the proximal portion 121 can include, besides the RFID receiver coil, a transmitter circuit 134 coupled to one or more temperature sensors located in the support arm, a resistor 136, and a DC-DC switched converter 138. The RF receiver coil 132 is designed to generate 5 Volts in response to the excitation provided by the corresponding external transmitter coil located in a headband.

The transmitter circuit 134 preferably transmits a signal indicative of the amount of power that is required by the receiver coil 132. The Qi protocol has been designed to meet this requirement, whereby the Resonant Inductive Coupling circuits automatically adjust the power transmitted to maintain a constant voltage of 5V at the output, even as the load current ranges from zero to the specified maximum of 500 mA that is supported by this protocol. Thus, if the receiver coil 132, which provides power to the LED element, is designed to maximize power efficiency as a standalone circuit, then it can be powered by the RFID transmitter no matter which mode the receiving device is in (i.e., On/Off/Standby/Debug).

Figures 5A, 5B:
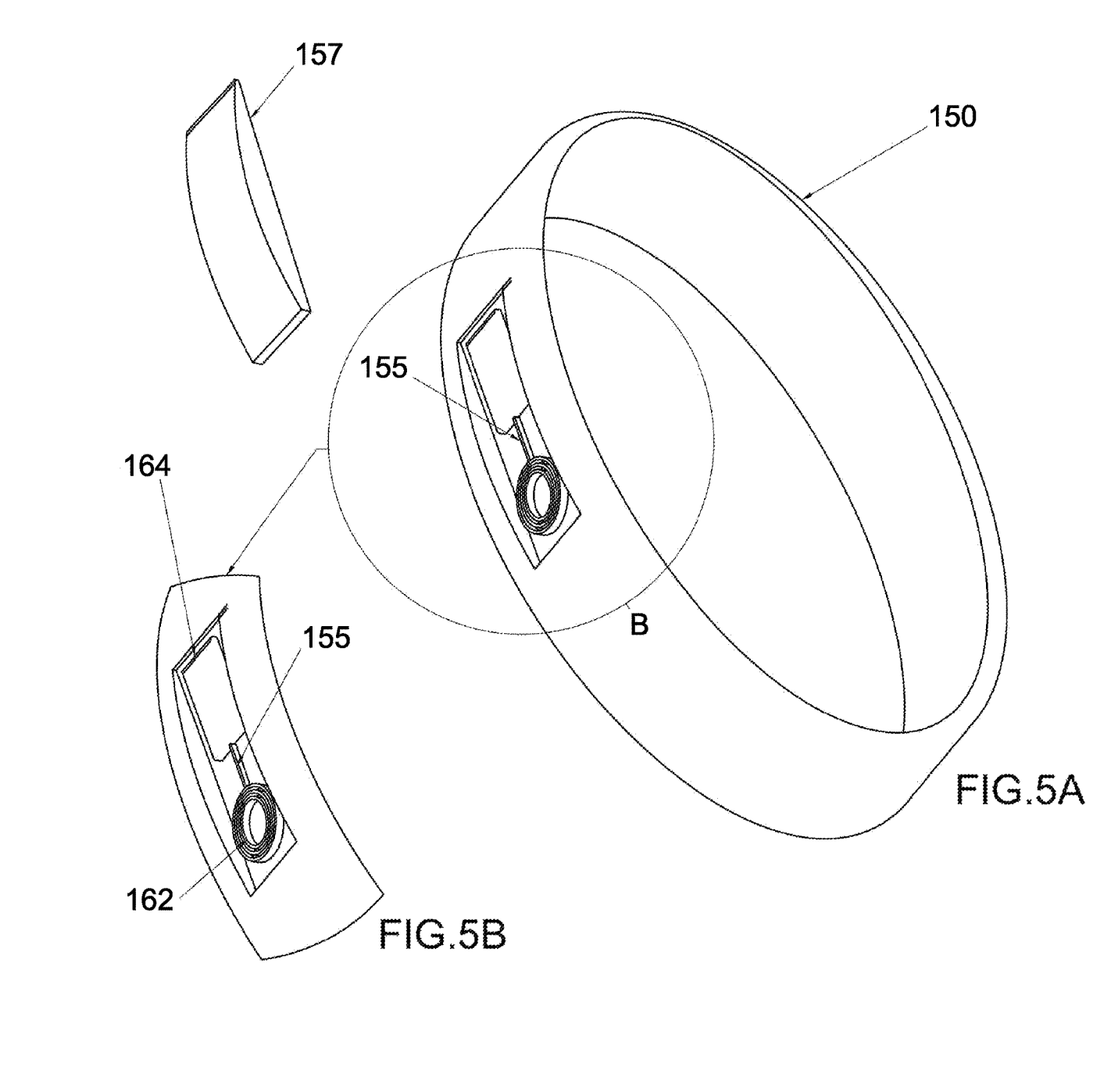
FIG. 5A is a perspective view of an embodiment of a headband device according to the present disclosure.
FIG. 5B is an enlarged view of area (B) shown in FIG. 5A.

To provide power to the implantable device, a headband device 150 designed to be worn by the patient is provided. The headband device 150 can thus be a continuous circular structure that can be placed around the head or it can have U-shape in that there is an opening or break formed along the body. The headband device 150 is designed to be snuggly fitted to the head. The headband device 150 includes an RFID transmitter circuit 155 positioned internally along (at least a portion of) the circumference of the headband device 150 that is operative to wirelessly transmit electrical energy to the RFID receiver 132 of the LED implant 120. The headband device 150 can be formed of any number of suitable materials so long as they do not interfere with the operation of the RFID transmitter circuit 155. In some embodiments, internal comfort padding that can be placed outside of the location of the RFID transmitter circuit 155 can be used.

FIG. 5A is a perspective view of an exemplary headband device 150 shown with a cover 157 of the RFID transmitter circuit 155 removed. An area (B) of FIG. 5A showing the RFID transmitter circuit 155 is shown in an enlarged view in FIG. 4B. As shown in FIG. 5B, the RFID transmitter circuit 155 includes a transmitter coil 162 and a battery element 164 for providing electrical current through the transmitter coil 162. The battery element 164 can further include a current sensor that detects the status of the LEDs in the implant indirectly from the power generated by the RFID transmitter coil 162. In accordance with the Qi protocol, the transmitter coil 162 is designed to induce a constant voltage of approximately 5 Volts in the receiver coil 132 of the LED implant 100 for powering thereof.

The implantable device 100 is installed in a patient by a surgical procedure. During the surgical procedure, a neurosurgeon performs a one-centimeter incision under the ear and performs a small craniectomy. The transparent sheath portion 110 is first inserted and positioned under the brain between the dura mater and the cranium. The proximal portion 111 of the sheath 110 is secured externally on the cranium and scalp with surgical screws. The LED implant 120 is then inserted into the transparent hollow sheath 110. Once inserted, the LED elements of the implant 120 can provide near-infrared radiation in the brain. The implant can be placed to target a particular region of interest, such as, for example, the hippocampus. A stitch is then used to close the incision. This design facilitates changing of the LED implant, if necessary, by subsequent removal of the stich and unfastening of the surgical screws of the sheath.

Figure 6A:
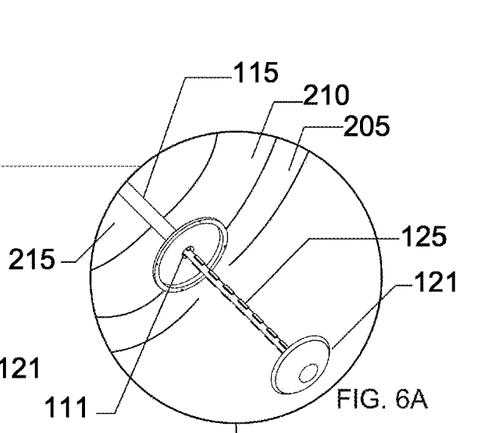
FIGS. 6A and 6B are schematic illustrations stages in the installation of an implantable device according to an embodiment of the present disclosure.
Figure 6B:
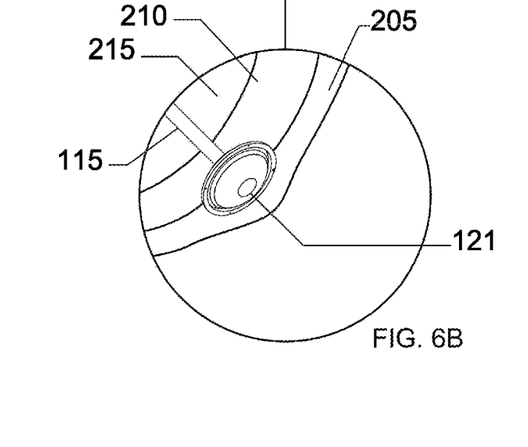

FIGS. 6A and 6B are schematic illustrations of two stages of the insertion of the implantable device 100. In FIG. 6A, sheath 110 is shown inserted through a hole through the scalp 205 and cranium 210 with the sleeve 115 entering the intracranial region 215. The proximal portion 111 is affixed to the scalp via screws (not shown in the figure) or other fastening elements and remains exposed in the scalp 205 of the patient during installation, forming a channel for the insertion of the LED implant 120. In FIG. 6A, the tip of the support arm 125 is shown entering the channel provided by the proximal portion of the sheath 111. In the second stage shown in FIG. 6B, the support arm 125 of the LED implant device is fully inserted into the sleeve 115 and the shell 121 of the implant device is embedded in (i.e., stitched onto) the scalp 205 of the patient.

FIG. 7A-7D similarly show stages of one exemplary insertion of the implantable device as illustrated via a sagittal cross-sectional view of an exemplary human head. In the example shown in FIGS. 7A-7D, the hippocampus is the targeted region in the brain at which to apply the photobiomodulation treatment using the disclosed device 100. Since the hippocampus is relatively deep within the brain (i.e., several centimeters from the back of the skull), the LEDs on the embodiment of the LED implant 120 shown are located primarily near the tip so as to focus light energy at the targeted region. It will be appreciated that in this described example, the brain is surgically prepared for receiving the device 100 in that an access opening is formed to permit insertion of the sheath 110 through the scalp into the brain to the target site.

Figure 7A:
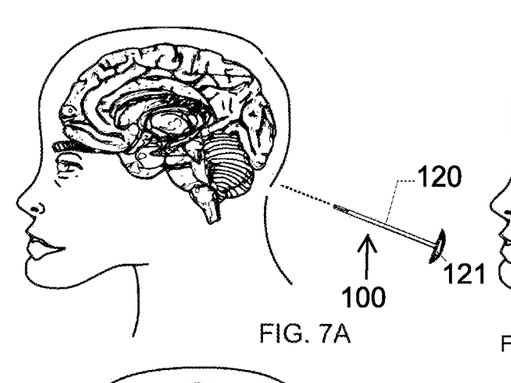
Figure 7B:
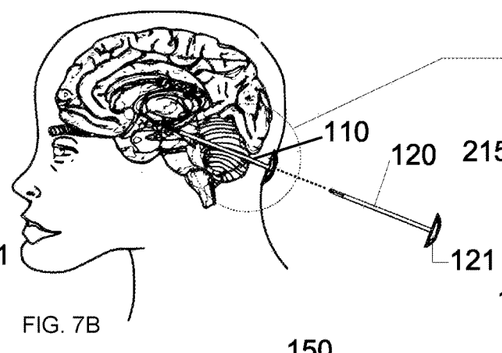
Figure 7C:
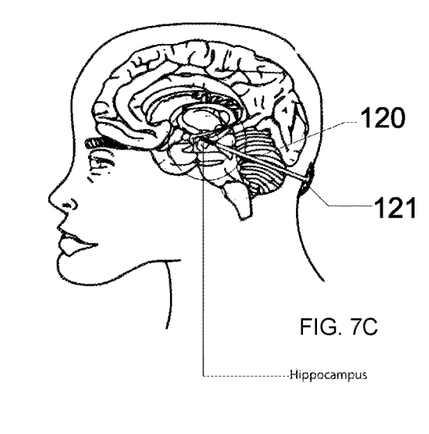
Figure 7D:
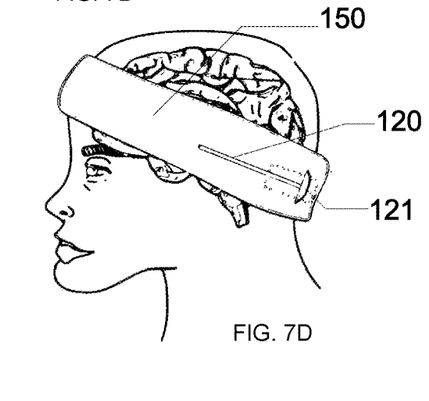

Referring now to an initial stage shown in FIG. 7A, an implant device 120 is positioned behind the head, pointing toward an approximate location on the skull at which the implant device is to be installed. FIG. 7B corresponds to FIG. 6A in that it shows a sheath 110 fully inserted relative to the target site, with the sleeve 115 penetrating through the intracranial region near to the targeted brain region. The LED implant 120 in FIG. 7B is shown exploded from the sheath 110 since it has not yet been introduced into the hollow interior of the sheath 110. In the following stage shown in FIG. 7C, the LED implant 120 is installed within the sheath 110 (by inserting the support arm 125 into the hollow sleeve 115) and the LEDs that are located along the support arm 125 are positioned proximate to the hippocampus (target tissue). In one embodiment, the implant device 120 can be securely coupled to the sheath 110 as by a friction fit, a reversible snap-fit or a reversible lock so that the two remain securely coupled to one another. FIG. 7D shows a headband device 150 positioned around the head and covering the implantable device. The headband device 150 is oriented on the head so that transmitter coil of the headband device 150 is positioned proximate to the receiving coil of the LED implant 120. For example, the two at least partially overlap when the headband device 150 is worn. It will be understood that the headband device 150 is preferably adjustable to allow it to fit different sized heads. Traditional headgear adjustment technologies can be used.

In some embodiments, correct operation of the LED elements is verified after implantation to determine whether the LEDs are emitting NIR, indicating that the device is on, or alternatively, whether the LEDs are not emitting NIR, indicating the device is off. The status of the LED elements can be inferred from the power transmitted by the transmitter coil 162 by the current sensor 164. In other words, a positive measurement by the current sensor 164 confirms operation of the LED elements.

Power efficiency of the device can be increased through employment of the DC-DC converter 138. The LED elements are biased at a particular current (I) and voltage (V) and the power dissipated by an LED element is equal to $P=V*I$. The voltages for the various types of LED elements are typically rated at around 1.25V for 950 nm, 1.5V for 850 nm and 2.2V for 670 nm. These voltages are less than the 5V that is generated by the Qi-protocol based receiver coil 132. For example, there is a power loss of $P=(5V-2.2V)*I$ for the 670 nm LED. The DC-DC converter 138 increases the power efficiency of the LED implant by stepping down the 5V generated by the Rx (receiver coil 132) device to a lower level, to for example: 2.3V to power the 670 nm LED; 1.6V to power the 850 nm LED; or 1.35V to power the 950 nm LED.

The implantable photobiomodulation device of the present disclosure can be applied in treating a number of conditions that have proven difficult to treat by conventional methods, including but not limited to other neurological conditions and disorders. It is expected to have advantages and benefits in comparison to the related art by enabling the NIR emitters to be positioned less than 3 cm. from the targeted neurological tissues. This distance is close enough for the NIR radiation to have an appreciable modulation effect. In addition to direct therapeutic uses for Alzheimer's disease described above, the implantable device disclosed herein can be applied in optogenetics applications. For example, the LED implant can be used to control neuronal synapses through genetic alteration induced by light. Through the implantable device, altered cells can be introduced and then controlled by induced activation.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. In at least one embodiment, the term "about" used in this application, and unless otherwise stated, means that the value of the indicated data/measurement (milometer, etc.) may vary within a range depending on the margin of error of the method or apparatus that was used to determine the data. A margin of error of at least within 5% (percent) can be accepted and more preferably within at least 1-2%.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. An intracranial photobiomodulation system (IPS) comprising:
   a removeable light therapy implant; and a permanent sheath,
   wherein the removeable light therapy implant is adapted to be removably secured to the sheath and has (i) a support arm having a proximal end and a distal end, and (ii) at least one light source located along the support arm, the at least one light source configured to emit light of at least one wavelength and at least one intensity for a set timing and duration, the permanent sheath comprising a shell and a sleeve, the shell being adapted to be permanently secured to a scalp of a patient, the sleeve being made of a light transmissive material and having a proximal opening and a distal closed tip, the proximal opening adapted to removably receive the support arm and light source of the removeable light therapy implant such that the permanent sheath surrounds the support arm and the light source.

2. The IPS according to claim 1, wherein the at least one light source is at least one light emitting diode.

3. The IPS according to claim 1, wherein the light of at least one wavelength is light of a wavelength equal to or greater than about 700 nanometers.

4. The IPS according to claim 1, wherein the light of at least one wavelength is light of a wavelength of about 380 nanometers to about 700 nanometers.

5. The IPS according to claim 1, wherein the light of at least one intensity is light of an intensity that is between about 0.1 mW/cm$^2$ to 5 W/cm$^2$.

6. The IPS according to claim 1, further comprising at least one light detector located between the proximal and distal ends of the support arm.

7. The IPS according to claim 1, wherein the removeable light therapy implant is adapted to be removably secured to the sheath by screws, friction, compression, clips, sutures, or combinations thereof.

8. The IPS according to claim 1, wherein the sleeve is made of polyurethane (PU), polytetrafluoroethylene (PTFE), fluorinated ethylene propylene (FEP), silicone, or combinations thereof.

9. The IPS according to claim 1, wherein the sleeve is made of fluorinated ethylene propylene (FEP).

10. The IPS according to claim 1, wherein the sleeve is adapted to deploy at least one active ingredient.

11. The IPS according to claim 10, wherein the active ingredient is an anti-infective drug.

12. The IPS according to claim 10, wherein the active ingredient is a light activated drug.

13. The IPS according to claim 1, further comprising a housing attached to the proximal end of the support arm, the housing adapted to enclose at least one electronic component to power or control the at least one light source.

14. The IPS according to claim 13, wherein the at least one electronic component is a wireless power receiver, a DC-DC converter, a current output detection circuit, or combinations thereof.

15. The IPS according to claim 1, further comprising an emitter adapted to enclose at least one electronic component to power or control the at least one light source.

16. The IPS according to claim 15, wherein the at least one electronic component enclosed in the emitter is a battery, a wireless power transmitter, or a combination thereof.

17. The IPS according to claim 15, wherein the emitter is adapted to fit on the patient's scalp.

18. A method for intracranial photobiomodulation of a brain region of a patient comprising the steps of:
   (i) providing an intracranial photobiomodulation system (IPS) comprising: a removeable light therapy implant and a permanent sheath, the removeable light therapy implant adapted to be removably secured to the sheath and having (i) a support arm having a proximal end and a distal end, and (ii) at least one light source located at least at the distal end of the support arm, the at least one light source configured to emit light of at least one wavelength and at least one intensity for a set timing and duration, the permanent sheath comprising a shell and a sleeve, the shell being adapted to be permanently secured to a scalp of the patient, the sleeve being made of a transparent material and having a proximal opening and a distal closed tip, the proximal opening adapted to removably receive the support arm and at least one light source of the removeable light therapy implant;

(ii) inserting the sleeve of the permanent sheath into the cranium of the patient and securing the shell of the permanent sheath to the scalp;

(iii) inserting the support arm and at least one light source through the proximal opening of the permanent sheath such that the at least one light source is positioned proximate to the brain region; and (iv) activating the IPS to provide photobiomodulation of the brain region.

19. A method for optogenetic stimulation of a target cell of a patient comprising the steps of (i) providing an intracranial photobiomodulation system (IPS) comprising: a removeable light therapy implant and a permanent sheath, the removeable light therapy implant adapted to be removably secured to the sheath and having (i) a support arm having a proximal end and a distal end, and (ii) at least one light source located between the proximal and distal ends of the support arm, the at least one light source configured to emit light of at least one wavelength and at least one intensity for a set timing and duration, the permanent sheath comprising a shell and a sleeve, the shell being adapted to be permanently secured to a scalp of the patient, the sleeve being made of a transparent material and having a proximal opening and a distal closed tip, the proximal opening adapted to removably receive the support arm and at least one light source of the removeable light therapy implant;

(ii) inserting the sleeve of the permanent sheath into a cranium of the patient and securing the shell of the permanent sheath to the scalp;

(iii) inserting the support arm and at least one light source through the proximal opening of the permanent sheath;

(iv) modifying the target cell to include a photosensitive protein; and (v) activating the IPS, whereby the target cell is stimulated.

20. A method of treatment of a patient using a photosensitive drug comprising the steps of:

(i) providing an intracranial photobiomodulation system (IPS) comprising: a removeable light therapy implant and a permanent sheath, the removeable light therapy implant adapted to be removably secured to the sheath and having (i) a support arm having a proximal end and a distal end, and (ii) at least one light source located between the proximal and distal ends of the support arm, the at least one light source configured to emit light of at least one wavelength and at least one intensity for a set timing and duration, the permanent sheath comprising a shell and a sleeve, the shell being adapted to be permanently secured to a scalp of the patient, the sleeve being made of a transparent material and having a proximal opening and a distal closed tip, the proximal opening adapted to removably receive the support arm and at least one light source of the removeable light therapy implant;

(ii) inserting the sleeve of the permanent sheath into the cranium of the patient and securing the shell of the permanent sheath to the scalp;

(iii) inserting the support arm and at least one light source through the proximal opening of the permanent sheath;

(iv) administering the photosensitive drug to the patient; and (v) activating the IPS, whereby the photosensitive drug is activated.

21. An intracranial photobiomodulation system (IPS) comprising:
a removeable light therapy implant including:
a flexible support arm having a proximal end and a distal end;
at least one light source positioned on the support arm configured to emit light of at least one wavelength and at least one intensity for a set timing and duration; and
a flexible sheath comprising a shell and a sleeve, the shell being adapted to be fixedly secured to a scalp of a patient, the sleeve being transparent and having a proximal opening and a distal closed tip, the proximal opening adapted to removably receive the support arm and light source of the removeable light therapy implant.

22. The intracranial photobiomodulation system (IPS) of claim 21, wherein the at least one light source is positioned at the distal end of the support arm.

23. An intracranial photobiomodulation system (IPS) comprising:
a permanent sheath that includes a first proximal end portion that has a recessed section and a hollow elongated flexible sleeve that is integral to and extends outwardly from the first proximal end portion, the recessed section having a through hole that forms an entrance into the hollow elongated flexible sleeve, the first proximal end portion being configured to be permanently secured to a scalp of a patient, the hollow elongated flexible sleeve being formed of a light transmissive material;
a removeable light therapy implant that is adapted to be removably coupled to the permanent sheath and is at least partially contained within the hollow elongated flexible sleeve, the removeable light therapy implant having a second proximal end portion and a support arm that extends outwardly from the second proximal end portion, the removeable light therapy implant including at least one light source located along the support arm, the at least one light source configured to emit light of at least one wavelength and at least one intensity, wherein in a fully installed position, the second proximal end portion is received within the recessed section and the support arm and light source of the removeable light therapy implant are received within the hollow elongated sleeve such that the hollow elongated flexible sleeve surrounds the support arm and the light source, wherein the second proximal end portion includes an RFID receiver that is configured to power the at least one light source; and
a headband device configured for placement about a head of the patient such that the headband device surrounds the permanent sheath and the removable light therapy implant contained therein, the headband device including an RFID transmitter circuit positioned internally along the circumference of the headband device that is operative to wirelessly transmit electrical energy to the RFID receiver of the removeable light therapy implant.

* * * * *